US006720290B2

(12) United States Patent
England et al.

(10) Patent No.: US 6,720,290 B2
(45) Date of Patent: Apr. 13, 2004

(54) FOAMING AGENTS FOR USE IN COAL SEAM RESERVOIRS

(75) Inventors: Kevin W. England, Houston, TX (US); J. Ernest Brown, Katy, TX (US); Jerald J. Hinkel, Houston, TX (US); Ramchandra M. Reddy, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 183 days.

(21) Appl. No.: 09/969,392

(22) Filed: Oct. 2, 2001

(65) Prior Publication Data

US 2003/0207768 A1 Nov. 6, 2003

Related U.S. Application Data

(63) Continuation-in-part of application No. 09/513,429, filed on Feb. 25, 2000, now abandoned.

(51) Int. Cl.[7] .......... C09K 3/00; C09K 7/02

(52) U.S. Cl. .......... 507/244; 507/209; 507/211; 507/213; 507/215; 507/216; 507/225; 507/202

(58) Field of Search .......... 507/244, 209, 507/211, 213, 215, 216, 225, 202

(56) References Cited

U.S. PATENT DOCUMENTS 4,453,596 A 6/1984 Conway et al. .......... 166/278
4,480,696 A * 11/1984 Almond et al. .......... 507/244
4,544,037 A 10/1985 Terry .......... 166/369
4,554,082 A * 11/1985 Holtmyer et al. .......... 507/202
4,591,447 A 5/1986 Kubala .......... 252/8.55
4,627,495 A * 12/1986 Harris et al. .......... 507/202
4,756,367 A 7/1988 Puri et al. .......... 166/263
4,796,702 A 1/1989 Scherubel .......... 166/308
4,883,122 A 11/1989 Puri et al. .......... 166/263
4,913,237 A 4/1990 Kutas .......... 166/308
4,993,491 A 2/1991 Palmer et al. .......... 166/280
4,995,463 A 2/1991 Kramm et al. .......... 166/308
5,014,788 A 5/1991 Puri et al. .......... 166/308
5,048,328 A 9/1991 Puri .......... 73/153
5,147,111 A 9/1992 Montgomery .......... 299/16
5,229,017 A 7/1993 Nimerick et al. .......... 252/8.551
5,360,558 A * 11/1994 Pakulski et al. .......... 507/244
5,390,741 A 2/1995 Payton et al. .......... 166/284
5,402,847 A 4/1995 Wilson et al. .......... 166/263
5,417,286 A 5/1995 Palmer et al. .......... 166/308
5,419,396 A 5/1995 Palmer et al. .......... 166/250
5,424,285 A * 6/1995 Stacy et al. .......... 507/202
5,470,823 A 11/1995 Williams et al. .......... 507/241
5,494,108 A 2/1996 Palmer et al. .......... 166/308
5,501,279 A 3/1996 Garg et al. .......... 166/372
5,566,760 A * 10/1996 Harris .......... 507/202
5,575,335 A * 11/1996 King .......... 507/202
5,669,444 A 9/1997 Riese et al. .......... 166/263
5,711,376 A 1/1998 Sydansk .......... 166/308
5,769,165 A 6/1998 Bross et al. .......... 166/266
5,853,224 A 12/1998 Riese .......... 299/13
5,865,248 A 2/1999 Riese et al. .......... 166/263
2003/0008781 A1 * 1/2003 Gupta et al. .......... 507/240

OTHER PUBLICATIONS

*Surfactants and Interfacial Phenomena*– Second Edition by Milton J. Rosen, John Wiley & Sons pp 28–31.

* cited by examiner

*Primary Examiner*—Philip C. Tucker
(74) *Attorney, Agent, or Firm*—Thomas O. Mitchell; Brigitte Jeffery; John Ryberg

(57) ABSTRACT

A well treatment fluid composition that comprises a carrier fluid and an amphoteric surfactant, and optionally a viscosifying agent and proppant, is well suited for use in fracturing coal beds to stimulate methane production. The composition preferably is a foam that comprises a gas such as nitrogen or air. Preferably, the surfactant has the formula $$R—NH_2—(CH_2)_n—C(O)OX$$

wherein R is a saturated or unsaturated alkyl group having from 6–20 carbon atoms, n is from 2–6, and X is hydrogen or a salt forming cation.

13 Claims, 2 Drawing Sheets

- ◆ - Baseline Permeability to Water
—■— Permeability to Water After 1 PV of 2gpt Surfactant F
- ▲ - Permeability to Water After 1 PV of 4gpt Surfactant F Permeability (Darcy)
Cumulative Pore Volumes

FOAMING AGENTS FOR USE IN COAL SEAM RESERVOIRS

CROSS REFERENCE TO RELATED APPLICATION

This application is a Continuation-In-Part of Ser. No. 09/513,429 that was filed on Feb. 25, 2000, now abandoned.

TECHNICAL FIELD OF THE INVENTION

This invention relates to the recovery of natural gas from coal seams and, more particularly, to a well treatment fluid and method of stimulating gas production from subterranean coal beds by hydraulic fracturing.

BACKGROUND OF THE INVENTION

Subterranean coal beds often contain large quantities of methane. The presence of methane in these subterranean coal deposits presents a safety hazard in coal mining operations, but also presents an opportunity for recovery of a valuable fuel. In the past, coalbed methane was often vented to the atmosphere or flared to reduce the safety risk in mining. More recently, in order to minimize air pollution and maximize economic return from coal bed operations, there has been an increasing focus on recovering methane rather than venting or flaring it. The recovery of coalbed methane is typically accomplished by drilling and completing a gas well into the coal seam and fracturing the well within the coal formation to enhance methane recovery.

Hydraulic fracturing methods for oil and gas wells drilled in a hard rock formation involve injecting a fracturing fluid (e.g., an aqueous gel or an aqueous foam) through the wellbore and against the face of the subterranean formation at pumping rates and pressures sufficient to create or extend cracks in the formation. Typically a proppant (e.g., sand or bauxite) is mixed with the fracture fluid and is carried by the fluid into the fractures. When the pumping rate and pressure are reduced, the fractured formation settles back onto the emplaced proppant, and the proppant holds the fractures open sufficiently to establish a permeable fluid communication channel from the tip of the pack of proppant back to the wellbore.

Fracture stimulation of coalbed methane reservoirs requires techniques quite different from those used in conventional hard-rock reservoirs. The methane in a coal seam is adsorbed to the surface of the coal. At a certain pressure, governed by the Langmuir desorption isotherm, the methane will begin to desorb from the coal. In addition, coal seams are often completely saturated with water. In these cases, large quantities of water must be removed in order to lower the reservoir pressure to a point below the methane desorption pressure. Therefore, a hydraulic fracturing treatment in a coal seam must be designed to produce water effectively.

Maintaining the coal in an oil-wet state facilitates water production. This is because coal is soft and friable. Wells are generally produced at maximum pressure drawdown to reduce the reservoir pressure as quickly as possible. The proppant particles (usually sand) become embedded into the fracture faces due to the increase in closure stress created by the high drawdown pressure. Proppant embedment causes a large quantity of coal fines to be produced. If these fines are water-wet, then they will be easily transported in the water phase during dewatering of the coal bed. The fines will then migrate into the fracture, eventually causing severe reduction of the fracture conductivity. It is therefore important to maintain the coal fines in an oil-wet state, so they will tend to clump together in the presence of water, thereby greatly reducing their mobility. This concept is also critical in the natural fracture (cleat) system of the coal adjacent to the hydraulic fracture. Coal fines will be generated due to shrinkage of the coal, oxidation, etc. These fines can cause plugging of the cleat system, which severely reduces the well productivity and ultimate gas production.

Additives exist that can provide good oil wetting of coal. For example, superior oil wetting in the presence of water can be achieved by methods and materials described in U.S. Pat. No. 5,229,017 (Nimerick and Hinkel). One such commercially available surfactant, denoted surfactant A herein, (available from Schlumberger), comprises a branched tridecyl alcohol with seven moles ethylene oxide (EO) and two moles butylene oxide (BO).

Foamed fracturing fluids are often preferred over non-foamed fracturing fluids in coal seam reservoirs in order to minimize the damage associated with the natural polymers typically present in the base fluid. Nitrogen is most often used as the gaseous phase in the foam fracturing treatments. However, materials that act as good oil-wetters for coal have been proven ineffective in providing stable aqueous foams. For example, surfactant A acts as an anti-foaming agent.

There is a need for improved fracturing fluids and methods that are suitable for use in coal beds to stimulate production of methane.

SUMMARY OF THE INVENTION

The present invention relates to a well treatment fluid composition that comprises a carrier fluid, a viscosifying agent, an amphoteric surfactant, and proppant. This fluid composition is especially well suited for use in fracturing gas wells in coal beds and is preferably used in a foam form, that is further comprising a gas such as nitrogen or air.

Preferably, the surfactant comprises an alkyl-aminocarboxylic acid or carboxylate, that is a zwitterionic compound of formula $R—NH_2—(CH_2)_n—C(O)OX$, where R is a saturated or unsaturated alkyl group having from 6–20 carbon atoms, n is from 2–6, and X is hydrogen or a salt forming cation. In various specific embodiments of the invention, n can be from 2–4; and R can be a saturated or unsaturated alkyl group having from 10–16 carbon atoms. More preferably, the surfactant is an alkyl-aminopropionic acid or propionate (n=2). One particular preferred surfactant is coco-aminopropionate, of formula RNH2CH2CH2COOX, where R is dodecyl, tetradecyl or hexadecyl, with a distribution of about dodecyl (C12), 40%, tetradecyl (C14), 50% and hexadecyl (C16), 10% and X is for example sodium.

The viscosifying agent can be, for example, a solvatable, crosslinkable polymer selected from the group consisting of guar, hydroxypropyl guar, carboxymethyl guar, carboxymethylhydroxypropyl guar, hydroxyethyl cellulose, carboxymethylhydroxyethyl cellulose, hydroxypropyl cellulose, xanthan, and mixtures thereof.

The can also include a crosslinking agent, a gel breaker for the viscosifying agent, and one or more other additives.

Another aspect of the present invention is a method of hydraulically fracturing a subterranean coal bed. This method comprises the step of injecting a well treatment fluid composition via a wellbore into a subterranean coal bed at a flow rate and pressure sufficient to produce or extend a fracture in the formation. The well treatment fluid composition can have the components described above. Alternatively, the fluid composition used in the method can be free of the viscosifying agent and/or proppant.

The present invention provides a remedial treatment of coalbed gas wells to enhance dewatering and the production of gas. The invention is useful both for fracturing newly drilled wells and for workover of existing wells (e.g., remedial fracturing of a well that has been producing for some time and has already been fractured in the past).

The surfactants used in the present invention have good oil wetting characteristics in the presence of coal, and are effective foaming agents. Thus, these surfactants are capable of creating a stable, foamed fluid, using either freshwater or brine, while maintaining the natural surface properties of the coal, and can minimize the mobility and migration of coal fines, thereby preserving fracture conductivity and cleat permeability. Additionally, the stability of foams formed with these surfactants should decrease with pH, which will facilitate clean up of the foam after the fracturing treatment (i.e., clean up can be performed with a reservoir fluid having a pH lower than the pH of the foam).

DETAILED DESCRIPTION OF PREFERRED EMBODIMENTS

Figure 1:
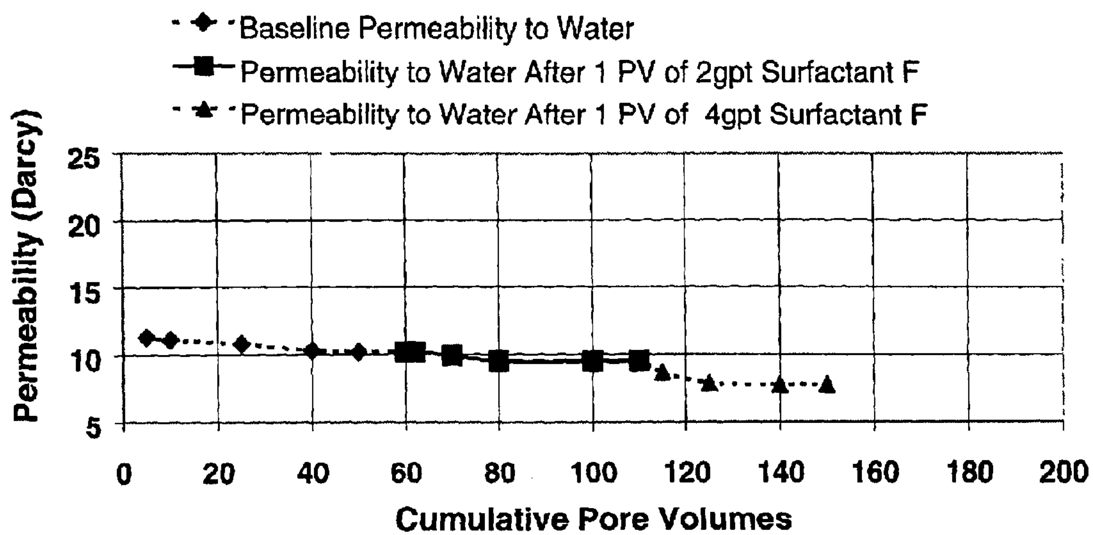
FIGS. 1–4 are graphs showing the change in permeability of a bed of coal particles after different fluids were passed through the bed.

To recover natural gas, principally methane, from a subterranean coal reservoir, a wellbore is drilled to the subterranean coal seam, and completed and perforated (or, alternatively, completed with a slotted liner, or completely open hole) in a manner similar to the procedure used for drilling and completing a normal subterranean gas well in a hard rock formation. The formation can then be fractured to stimulate production of subterranean fluids (liquids and gases).

Fracturing fluids typically comprise an aqueous liquid carrier fluid, which is commonly viscosified to improve its rheological and proppant-carrying properties. A preferred fracturing fluid of the present invention comprises an aqueous carrier fluid (e.g., brine), a solvatable and crosslinkable polymer to provide increased viscosity, at least one surfactant, and proppant. Suitable solvatable polymers include guar, hydroxypropyl guar, carboxymethyl guar, carboxymethylhydroxypropyl guar, hydroxyethyl cellulose, carboxymethylhydroxyethyl cellulose, hydroxypropyl cellulose, xanthan, and mixtures thereof. Cross-linking agents, such as borates, titanates, zirconates, and/or aluminates, can be included in the composition, to cross-link or gel the polymer, in order to increase their proppant-carrying capacity and improve their rheological properties. Optionally, an agent to delay cross-linking, such as chelants or ligands (e.g., functionalized amines, such as triethanolamine, or functionalized carboxylic acids, such as citric acid) can also be included. The composition can also comprise gel breaking agents, such as ammonium persulfate (oxidizers), in order to break the viscous gels and assist in the return of the fracturing fluids to the wellbore once the fracturing operation has been completed. Generally, delay agents will not be needed for a foam.

The fracturing fluid composition contains at least one surfactant that will keep coal fines oil-wet and is an effective foaming agent. Coco-aminopropionate is one suitable example of such a surfactant.

These surfactants are zwitterionic in nature. Foam prepared using freshwater or a KCl brine will possess a neutral pH. Often the pH of the water in a coal seam is less than 7. The zwitterionic nature of these foaming agents will causes the foam to be less stable as the pH of the fluid is lowered. Hence, contact with formation water will help destroy the foam, thereby facilitating its removal.

The fracturing fluid preferably also comprises a gas, such as air or nitrogen, to foam the fluid. The gas also assists in the well clean-up process following breaking of the gel. Carbon dioxide can also be used to create the foam, and can even be pumped ahead of the foam fracturing treatment for purposes of (1) providing additional energy for fluid clean-up, (2) providing additional hydrostatic pressure above that obtained through the use of nitrogen or air, (3) conditioning the coal, whereby the carbon dioxide has ability to displace methane adsorbed to the coal.

Optionally, the fracturing fluid can further contain one or more additives such as additional surfactants, breaker aids, scale inhibitors, and bactericides. The breaker aids serve as catalysts to increase the breaker activity and performance at the lower bottomhole temperatures usually associated with fracturing coalbed methane wells. The composition can also contain an additive, such as a polyacrylamide or the like, that decreases the frictional pressure of pumping the fluid through the tubing, casing, tubing/casing annulus, surface lines, etc.

It is also possible to use a fracturing fluid composition that does not contain any viscosifying agent. The fracturing fluid in this case could just contain water or brine, the foaming surfactant, and other necessary additives (such as biocides).

Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation.

In a typical fracturing process, the fracture is initiated by pumping an aqueous fluid with good to moderate leak-off properties, low polymer loadings and, typically, no proppant, into the formation. This initial fluid, referred to as a "pad", is followed by a fracturing fluid of higher viscosity, carrying initially low quantities and then gradually increasing quantities of proppant into the fractures. Once the proppant has been placed in the fractures, fracturing pressure is released and the fractures partially close against the proppant which retains the fractures in a partially open, high permeability condition.

While compositions of the present invention are described herein as comprising certain materials, it should be understood that the composition can optionally comprise two or more chemically different such materials. For example, a composition could comprise a mixture of two or more foaming surfactants having the above-described characteristics.

The present invention can be further understood from the following examples.

EXAMPLE 1

A wetting test was performed using a modification of the method described in API Bulletin RP 42. The procedure comprised:

1. Fill glass jar with 50 mL of 2% KCl and add surfactant.
2. Place 5 grams of crushed coal into the solution prepared in Step 1 and mix for 60 seconds.
3. Decant the liquid from the slurry prepared in Step 2 into another glass jar.
4. Add 50 mL of dyed kerosene to the jar containing the decanted liquid.

5. Drop the coal solids into the jar prepared in step 4.
6. Observe the color and dispersibility of the coal particles.

The coal was in the form of large chunks of weathered (water wet) material. The surfactants used are summarized in Table 1.

TABLE 1

| Surfactant | Chemical description |
|---|---|
| A | branched tridecyl alcohol (7 moles EO and 2 moles BO) |
| B | anionic ethoxylated ammonium fatty alcohol ether sulfate |
| C | A cationic polymeric quaternary salt disclosed as a polyquat. |
| D | cationic blend of quaternary amine & alkanolamine |
| E | anionic/cationic blend of quaternary amine & aromatic glycol ether |
| F | coco-aminopropionate |
| G | cationic quaternary amine |

Surfactants C and F are both expected to possess an isoelectric point somewhere near a pH of 4.

All surfactants were tested at a concentration of 2 gallons of surfactant/thousand gallons of brine. The dyed kerosene was prepared by dissolving 0.1 g of dye in 700 mL of kerosene.

After performing the tests described above, the mixtures of brine, kerosene and coal particles were shaken vigorously for 10 seconds. A video camera was used to record results at 0, 15, and 30 minutes.

A foaming test was performed using the following procedure:

1. In a 1 L calibrated blender jar, add 1 mL of surfactant to 200 mL of 2% KCl.
2. Set the Variac variable speed controller for Waring blender to zero, and set the blender to high.
3. Gradually increase the Variac setting until the greatest stable foam height is reached. If the liquid bounces, reduce the Variac setting and slowly increase the setting until a stable foam height is reached. Hold at the maximum setting for 15 seconds.
4. Cut the power to the blender and immediately record the foam height and start the timer.

Record the time required for 100 mL to accumulate in the bottom of the blender jar.

The results of the wetting and foaming tests are shown in Table 2 below.

TABLE 2

| Experiment No. | Surfactant | Wetting Properties | Good Foaming? | Foam Half-Life (min:sec) |
|---|---|---|---|---|
| 1-1 | A | Oil Wet | No | No foam |
| 1-2 | B | Water Wet | Yes | 4:40 |
| 1-3 | C | Water Wet | Yes | 3:20 |
| 1-4 | D | Water Wet | Yes | 4:20 |
| 1-5 | E | Water Wet | Yes | 3:00 |
| 1-6 | F pH = 7 | Oil Wet | Yes | 5:10 |
| 1-7 | F pH = 5 | Oil Wet | Yes | 4:00 |
| 1-8 | G | Water Wet | Yes | 4:10 |

As can be seen in Table 2, only surfactant F provided good oil wetting properties and a stable foam. The samples were observed for 45 minutes.

Experiment 1-1

Previous testing of surfactant A, both in the laboratory and in the field, has shown this additive to have superior de-watering properties for coalbed methane wells, which increases the production of natural gas from such wells. The current testing of surfactant A again shows that this additive should enhance de-watering of coals due to very strong oil-wetting properties. Visual observation of the results of this experiment clearly showed coal fines being captured in the diesel phase above the oil-water interface. Larger wetted pieces of oil-wet coal were held at the interface by the strong wetting properties. The water phase was exceptionally clear. This indicates that all of the coal was attracted to the oil phase or settled to the bottom due to density differences, demonstrating the strong oil-wetting tendencies of surfactant A. Finally, an evaluation performed on the coal at the bottom of the sample jar also indicated an oil-wet condition due to the strong clumping tendencies between the individual coal particles. When the jar was tilted, the coal did not move until the jar bottom reached a very high angle (>60°) and then the coal particles moved as a single mass—indicating their strong attraction to one another.

Experiment 1-3

Surfactant C created a stable emulsion between the kerosene and water phases. The water phase did not clear up within the 45-minute time interval, due in part to the emulsion and in part to the presence of the coal fines. The heavy concentration of coal fines in the water phase indicated that the coal was water-wet. Prior to the shaking step, the flow of the large coal particles was tested by tilting the jar, and in this test the coal particles flowed freely without clinging to one another and moved at a relatively low angle (<45°). The free flowing nature of the particles in the water phase indicated water-wetting.

Experiment 1-4

Surfactant D showed strong water wetting of the coal, since there were few, if any, coal particles at the interface, and most particles were in the water phase. There was a heavy concentration of coal particles attached to the sample jar within the water phase. Particles in the water phase showed no tendency to clump when the sample jar was tilted, again indicating water-wetting properties.

Experiment 1-6

This experiment was conducted using surfactant F. A large quantity of coal particles could be seen in the oil phase, accumulating just above the oil-water interface, thus indicating strong oil wetting tendencies of this surfactant. There were no fines dispersed throughout the water layer. Several large coal particles were even attracted to the oil phase. Buoyancy forces were able to move these large particles upward to the oil face even after density differential initially sank these particles to the bottom of the jar. When tilted, the coal particles clumped together at the bottom of the jar.

Experiment 1-8

This experiment used surfactant G. Though the sample was cloudy, it was apparent that the material did not provide good oil wetting, as both the oil phase layer and the oil-water interface were essentially free of coal particles, and the coal fines in the water phase quickly settled without clumping. Some small coal fines could be seen sticking to the jar within the water phase, indicating water-wetting tendencies. The coal particles lying on the jar bottom flowed freely and independently of one another when the jar was tilted, again demonstrating a water-wet condition for the coal particles.

Since only surfactant F met both the wetting and foaming criteria, it was selected for further foam stability testing.

The foam stability tests were run with surfactant F at pH=7 and pH=5. The foam half-life was observed to be 5 minutes and 10 seconds at pH=7. The half-life dropped to 4 minutes at pH=5. The initial foam height was also less at the lower pH. When isopropyl alcohol was added to surfactant F, the foam half-life at pH=7 was decreased to 4:40.

EXAMPLE 2

Tests were performed to assess the capability of the surfactant in maintaining the relative permeability to water flowing through a column of fresh coal. The procedure involved grinding or crushing coal into particles less than ¼-inch in size. This material was then packed into a Plexiglas tube and connected to a water source at the top end of the tube. The flow of water was maintained at a constant pressure drop through the pack and the amount of effluent was measured out the bottom of the pack as a function of time so that the permeability could be calculated. The average permeability of the column with less than ¼-inch coal particles was around 10 darcies.

The coal for this testing was obtained from the Fruitland Coal formation, which is located in the San Juan Basin in New Mexico. The coal was obtained directly from an active mine and shipped in a sealed container overnight to minimize the aging of the sample. Tests were run by establishing a baseline permeability to water through the pack and then introducing one pore volume of the system to be evaluated. Following this addition, the flow of water through the pack was reestablished and the change in permeability was noted. Another key observation was any coal fines that were transported through the pack and seen in the effluent. This phenomenon is usually associated with a sharp decrease in the permeability of the pack, indicating that the additive has not maintained the natural oil-wet state of the coal and thus cannot prevent the mobilization of the fines.

The tests were centered on surfactant F; however, other tests were performed as a reference point to illustrate the benefit of this additive over conventional foaming agents. FIG. 1 shows the effect of surfactant F on the permeability of the coal pack at 2 and 4 gal/1000 concentration. It is important to note that the recommended concentration for surfactant F as a foaming agent is 2 gal/1000. The 4 gal/1000 concentration was tested to ensure there was no negative impact due to overtreating. Based on visual observation it was noted that the reduction in permeability at the 4 gal/1000 concentration was most likely due to foam blockage in the permeability channels. This could be an effect of excess surfactant available or some other mechanism. At either concentration the results were very acceptable as the percent retained permeability was 95% for the 2 gal/1000 concentration and 80% for the 4 gal/1000.

Figure 2:
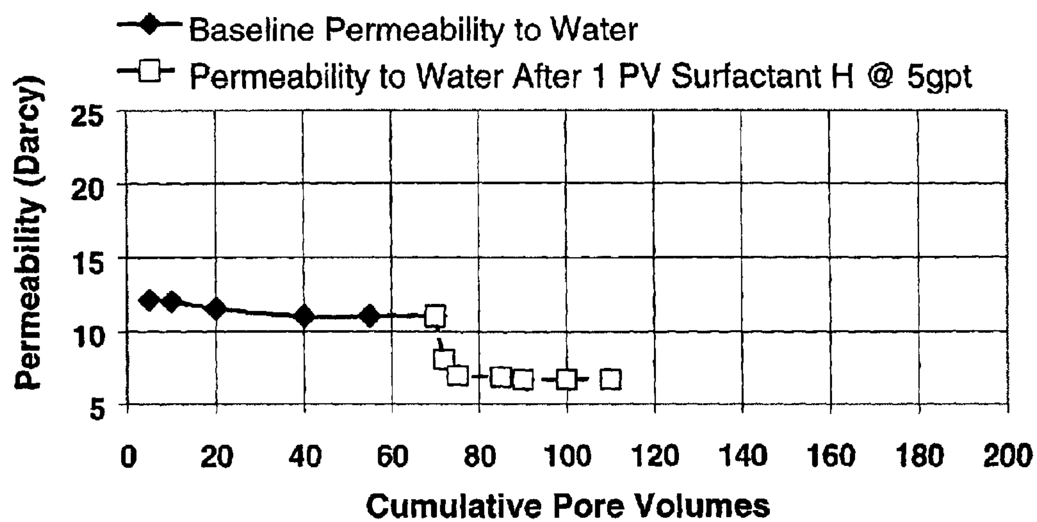

The most common foaming agent being used today for fracturing coal seam reservoirs is anionic in nature (referred to herein as surfactant H; contains ethoxylated ammonium fatty alcohol ether sulfate at lower concentration than surfactant B) and typically added at a concentration of 5 gal/1000. FIG. 2 shows the test results for one pore volume of this material. There was a sharp decrease in permeability following the introduction of surfactant to the pack. Visual observation also noted the presence of coal fines in the effluent following the addition of the fluid containing the surfactant H. This effect, coupled with nearly a 50% reduction in retained permeability, can have a very detrimental impact on the short and long-term productivity of a coalbed methane well. The release of coal fines is indicative of a wettability change due to the fact that wetted material will tend not to be mobilized in the non-wetting phase. This simply means that the oil-wet coal fines (wetted material) will tend not to be mobilized in the water (non-wetting phase) flowing through the pack. If the wettability of the coal surface and fines are altered, then it is possible for the fines to be transported through the pack with the water.

Figure 3:
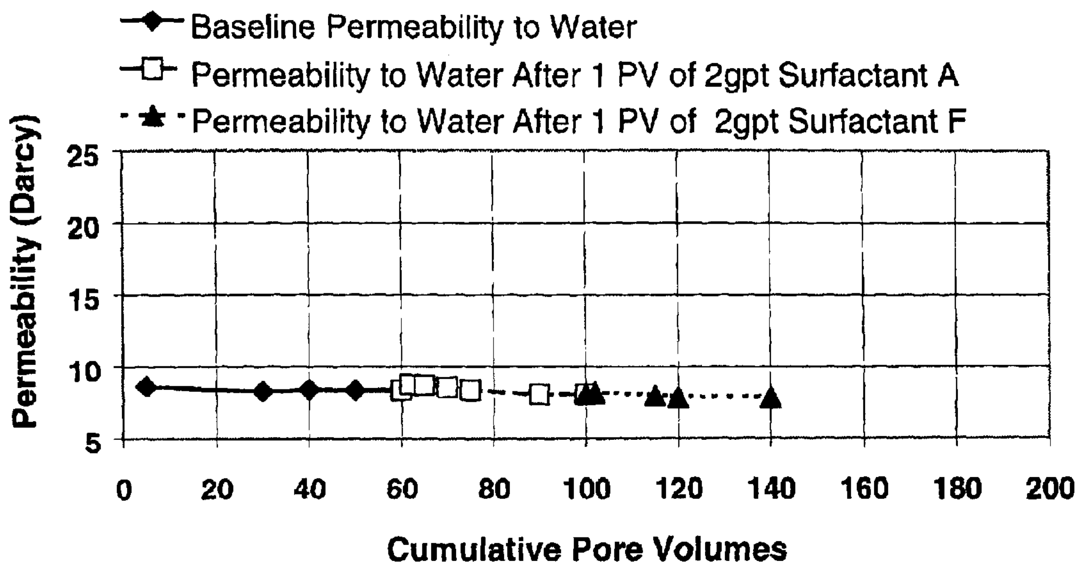

One of the major issues with testing coal samples is the content (make-up) and chemical state of the coal being tested. Different coals will give different results in terms of magnitude but the relative effect should remain the same. When surfactant A was developed, it was tested on many different types of coal that had undergone various degrees of weathering, etc. It was found that surfactant A would still show improved results in terms of flowing through the coal pack regardless of the conditions. For this reason, it was decided to run a test with surfactant A and follow with surfactant F to see if the coal responded normally to surfactant A and make sure that the surfactant F would still be effective. FIG. 3 shows the results of this test sequence by adding one pore volume of surfactant A at 2 gal/1000 followed by one pore volume of surfactant F at the recommended concentration of 2 gal/1000. The results indicate nearly 100% retained permeability under these conditions. This test is relevant to pre-flushing a foam fracturing treatment with surfactant A, or to a refracturing treatment on a well where surfactant A had been previously pumped.

Figure 4:
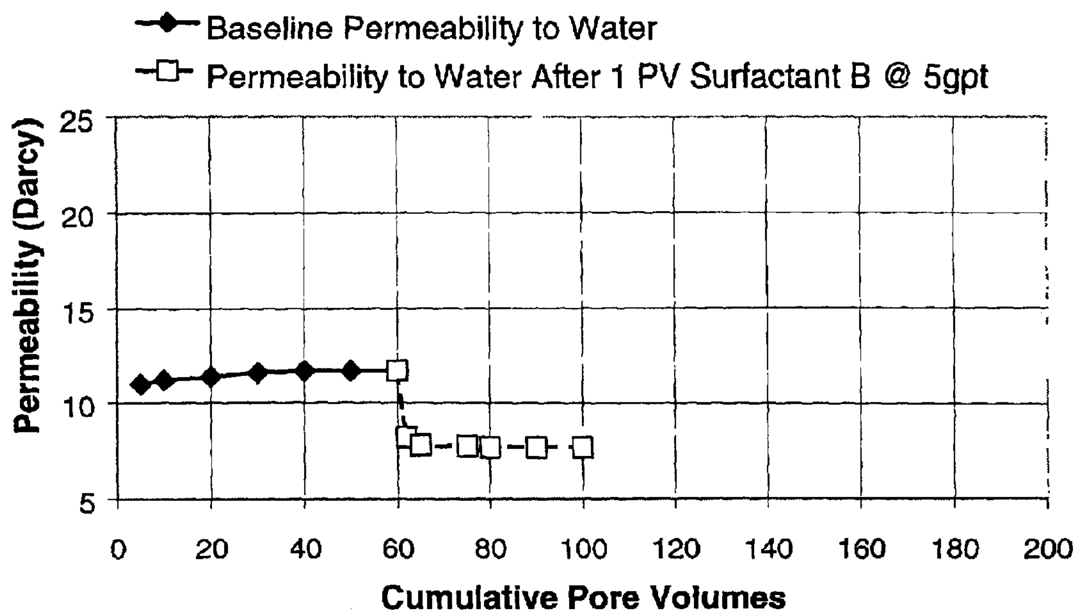

The final test was to evaluate another anionic foaming agent (surfactant B), which is the most widely used foaming agent outside of coalbed methane wells. The results, shown in FIG. 4, are very similar to those obtained with the anionic foaming agent used in fracturing coalbed methane wells (surfactant H). As with the surfactant H, coal fines were visually observed in the effluent following addition of the surfactant B. This mobilization of coal fines will be much more damaging under field conditions where they can fill the wellbore above the perforations, requiring cleanout, plug and damage artificial lift equipment and block the cleat system which the are the arteries of the coal system when it comes to producing fluids.

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A well treatment fluid composition, comprising a carrier fluid, a viscosifying agent, an amphoteric surfactant, and proppant, wherein the surfactant has the formula $R—NH_2—(CH_2)_n—C(O)OX$ wherein R is a saturated or unsaturated alkyl group having from 6–20 carbon atoms, n is from 2–6, and X is hydrogen or a salt forming cation.

2. The composition of claim 1, wherein the composition is a foam that comprises a gas selected from the group consisting of nitrogen, air, and carbon dioxide.

3. The composition of claim 1, wherein n is from 2–4.

4. The composition of claim 1, wherein R is a saturated or unsaturated alkyl group having from 10–14 carbon atoms.

5. The composition of claim 1, wherein the surfactant comprises an alkyl-aminopropionic acid or propionate.

6. The composition of claim 1, wherein the surfactant is a coco-aminopropionate.

7. The composition of claim 1, wherein the viscosifying agent is a solvatable, crosslinkable polymer selected from the group consisting of guar, hydroxypropyl guar, carboxymethyl guar, carboxymethylhydroxypropyl guar, hydroxyethyl cellulose, carboxymethylhydroxyethyl cellulose, hydroxypropyl cellulose, xanthan, and mixtures thereof.

8. The composition of claim 7, further comprising a crosslinking agent.

9. The composition of claim 7, further comprising a gel breaker for the viscosifying agent.

10. The composition of claim 9, further comprising a breaker aid.

11. The composition of claim 1, further comprising an additive that decreases the frictional pressure involved in pumping the fluid composition through well tubing.

12. The composition of claim 11, wherein the additive comprises at least one polyacrylamide.

13. A well treatment fluid composition, comprising a carrier fluid; a viscosifying agent selected from the group consisting of guar, hydroxypropyl guar, carboxymethyl guar, carboxymethylhydroxypropyl guar, hydroxyethyl cellulose, carboxymethylhydroxyethyl cellulose, hydroxypropyl cellulose, xanthan, and mixtures thereof; a coco-aminopropionate surfactant; and proppant.

* * * * *